(12) United States Patent
Paulsen et al.

(10) Patent No.: US 10,289,624 B2
(45) Date of Patent: May 14, 2019

(54) TOPIC AND TERM SEARCH ANALYTICS

(71) Applicant: ADOBE INC., San Jose, CA (US)

(72) Inventors: Trevor Hyrum Paulsen, Lehi, UT (US); Jaime Vasquez, Portland, OR (US)

(73) Assignee: ADOBE INC., San Jose, CA (US)

( * ) Notice: Subject to any disclaimer, the term of this patent is extended or adjusted under 35 U.S.C. 154(b) by 232 days.

(21) Appl. No.: 15/065,587

(22) Filed: Mar. 9, 2016

(65) Prior Publication Data

US 2017/0262448 A1   Sep. 14, 2017

(51) Int. Cl.
G06F 17/30 (2006.01)
G06F 16/2457 (2019.01)
G06F 16/28 (2019.01)
G06F 16/9535 (2019.01)
G06F 16/958 (2019.01)

(52) U.S. Cl.
CPC .. G06F 16/24578 (2019.01); G06F 16/24573 (2019.01); G06F 16/285 (2019.01); G06F 16/958 (2019.01); G06F 16/9535 (2019.01)

(58) Field of Classification Search
CPC ........... G06F 17/3053; G06F 17/30525; G06F 17/30; G06F 17/30867; G06F 16/24578; G06F 16/24573; G06F 16/285

USPC .................................................. 707/600–899
See application file for complete search history.

(56) References Cited

U.S. PATENT DOCUMENTS

2009/0125498 A1* 5/2009 Cao ................... G06F 17/30663
2012/0158693 A1* 6/2012 Papadimitriou .. G06F 17/30864
707/708

* cited by examiner

*Primary Examiner* — Isaac M Woo
(74) *Attorney, Agent, or Firm* — Shook, Hardy & Bacon L.L.P.

(57) ABSTRACT

Systems and methods provide for analyzing a group of online articles to identify relevant and popular online articles given a selection of topic(s) and/or term(s). An article score is generated for each online article based on the selected topic(s) and/or term(s) as a function of the relevance of the topic(s) and/or term(s) to the online article and visitor metrics for the online articles. The online articles are ranked based on the article scores, and an indication of the ranked online articles is provided for presentation to the user. In further embodiments, important terms are identified for a selection of topic(s) and/or term(s) based on the most relevant and popular online articles for the selected topics/terms.

18 Claims, 14 Drawing Sheets

TOPIC AND TERM SEARCH ANALYTICS

BACKGROUND

With the advent and growth of the Internet, it has become common for articles, such as news articles and editorials, to be published online on publication websites such that the articles are accessible to readers over the Internet using a web browser or other application. Publishers are continuously tasked with determining what types of articles to publish on their websites to bring in the most readers. Currently, some web analytics tools provide publishers access to specific reports about their articles published online. For instance, publishers are able to view reports regarding which online articles have the highest number of unique visitors for a given time period or trended over time. While these reports are helpful to publishers, they do not give insight into how to frame articles to fit the interests of specific audiences to assist in writing articles about specific topics.

SUMMARY

Embodiments of the present invention relate to, among other things, analyzing a group of online articles to identify relevant and popular online articles given a user selection of topic(s) and/or term(s). An article score is generated for each online article based on the selected topic(s) and/or term(s). For each topic, an article topic score for a given online article is computed as a function of a relevance score of the topic for the online article and visitor metrics for the online article. For each term, a term score for a given online article is computed as a function of a term frequency of the term in the online article and visitor metrics for the online article. The article score for each online article is computed by summing the article topic scores and terms scores for each online article. The online articles are ranked based on the article scores, and an indication of the ranked online articles is provided for presentation to the user. In further embodiments, important terms are identified for a selection of topic(s) and/or term(s) based on the most relevant and popular online articles for the selected topics/terms.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
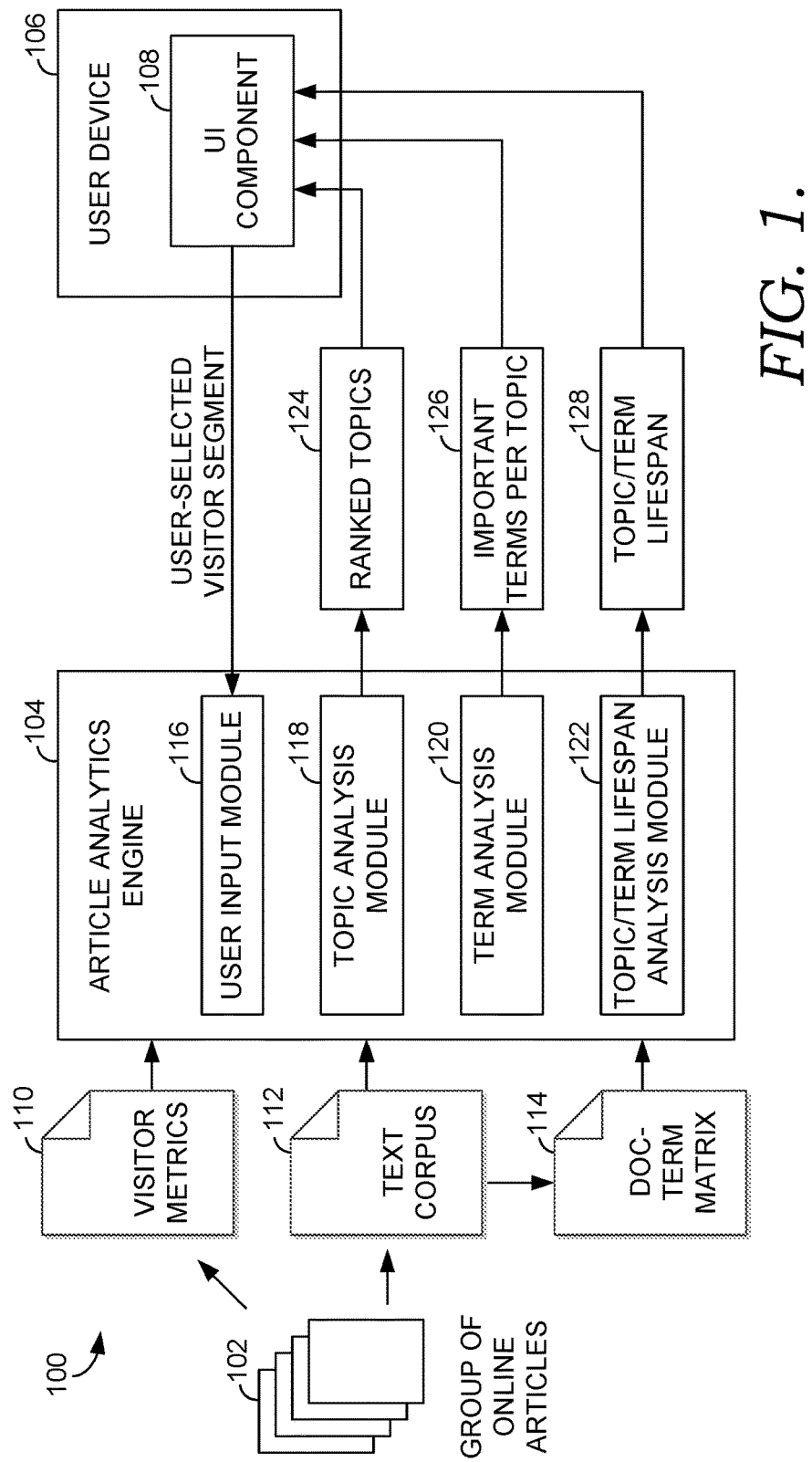
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

As used herein, the term "online article" refers to a written work published in an electronic form that is accessible over a network, such as the Internet, using a web browser or other application. For instance, an online article may be a news article or editorial. An online article is typically located at a particular URL (uniform resource located). In some instances, collections of online articles are available at publication websites, such as news websites or online magazines.

The term "visitor" refers to a person who accesses an online article over a network using a web browser or other application.

The term "visitor metrics" refers to data collected regarding visitors to online articles. The visitor metrics for a given online article may include, for instance, total page views, unique visitors, time stamps of when accessed, length of time viewed, and visitor characteristics (e.g., demographics such as gender, age, geolocation, etc.).

The term "document-term matrix" refers to a matrix that indicates the number of times each term appears in each online article. For instance, in one configuration, the document-term matrix includes unique terms across the online articles as its columns and unique online articles as its rows. "Term frequency" or "frequency" is used herein to refer to the number of times a term appears in an online article.

"Term" is used herein to refer to a single word or multi-word phrase included in an online article. Multi-word phrases include n-grams, which are sequences of "n" number of consecutive or almost consecutive words.

The terms "topics" and "subtopics" are used herein to refer to central ideas or concepts discussed in an online article. Topics can be arranged in a hierarchical fashion based on the relationship between topics and subtopics. For instance, a topic may have a number of subtopics related to that topic, and each subtopic may have further subtopics, and so on.

The term "user" is used herein to refer to a publisher, editor, author, or other person who employs the analytical tools described herein to explore relevant and popular topics and terms of online articles.

Often, a publisher/editor/author would like to write an article about a specific topic, but does not know how they should frame the article to fit the interests of specific audiences. For example, if an author knows they would like to write an article about Hugh Jackman at the Oscars, the author may not know what details would be the most relevant to a selected audience. Available web analytics tools allow users to view the popularity of previously published online articles, but the tools fail to identify the topics discussed in the various online articles or otherwise provide additional information to assist in writing new articles. An author could sift through the popular online articles, but this would require the author to view a large number of online articles, many of which are irrelevant to the topic of interest to the author.

Embodiments of the present invention overcome the problems of existing web analytics tools noted above by providing a solution that allows a user to select any combination of topic(s) and/or term(s) and receive a list of the most popular online articles relevant to those selected topic(s) and/or term(s) so the user can see what type of content has been successful in the past. More particularly, given user selected topic(s) and/or term(s), article scores are computed for each of a number of previously published online articles. An article score for a given online article is a function of the online article's relevance to the selected topic(s) and/or term(s) and popularity of the online article based on visitor metrics for the online article. In instances in which the user has also specified a particular visitor segment, the visitor metrics used correspond to that visitor segment. A set of ranked articles is then provided based on the article scores, and an indication of the ranked articles may be provided for display to the user via one or more user interfaces.

Some additional embodiments are directed to identifying important terms associated with a given selection of topic(s) and/or term(s) based on the most relevant and popular online articles for the selected topics/terms. This allows an author to explore terms the author may wish to use when writing a new article about any selection of topics and/or terms of interest to the author. More particularly, given a user selection of topic(s) and/or term(s), popular online articles are selected. Term scores are generated for terms in each online article as a function of term frequency and an article score for each online article (the article score reflecting the online article's relevance to the topic(s)/term(s) and the online article's popularity). An aggregated term score is generated for a given term by summing the term scores for the term from each of the popular online articles. Information regarding popular terms based on the aggregated term scores is provided for presentation to a user via one or more user interfaces.

Topic and Term Popularity and Lifespan within Online Articles

With reference now to the drawings, FIG. 1 is a block diagram illustrating an exemplary system 100 for analyzing online articles to identify popular topics and terms, as well as the lifespan of the topics and terms in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes an article analytics engine 104 configured to process information regarding a group of online articles 102 to provide user interfaces that allow a user to investigate popular topics and terms from the group of online articles 102. The article analytics engine 104 may be provided, for instance, by a web analytics tool, such as the ADOBE ANALYTICS tool (available from Adobe Systems Inc. of San Jose, Calif.).

The group of online articles 102 comprises a collection of articles that are stored in electronic form on one or more server devices (not shown). In some instances, the group of online articles 102 includes all available online articles from a particular website for a given publication. For example, the group of online articles 102 could include all articles published at the Vanity Fair website over a given time period. In other instances, the group of online articles 102 includes only a subset of online articles available at a given website or a selection of online articles from multiple websites. Each online article may correspond to a different URL at which the online article is available.

Visitor metrics 110 are collected regarding each online article from the group of the online articles 102, for instance, using a web analytics tool, such as the ADOBE ANALYTICS tool. A variety of visitor metrics 110 may be collected and made available to the article analytics engine. For instance, the visitor metrics 110 for each online article may include a total number of page views and/or unique visitors. The visitor metrics 110 may also include information regarding each page view or unique visitor, such as time stamps of when accessed, length of time viewed, and visitor characteristics (e.g., demographics such as gender, age, geolocation, etc.).

The text corpus 112 is a collection of the text of each online article from the group of the online articles 102. In some configurations, the text of each online article is retrieved using a web crawler to access the URL associated with each online article and download raw text from each URL. The retrieved raw text is then stored in the text corpus 112.

The document-term matrix 114 is generated by processing the text of the group of online articles 102 to identify the number of times each term appears in each online article (i.e., a term frequency). For instance, in one configuration, the document-term matrix 114 includes unique terms across the group of online articles 102 as its columns and unique online articles as its rows. Each online article may be identified in the document-term matrix 114, for instance, using a URL at which each online article appears. The document-term matrix 114 is prepared using any of a number of different preprocessing steps in various embodiments. For instance, common words and stop words may be removed since the words provide little value. Additionally, word stemming may be performed to reduce terms to their base form. Further, the document-term matrix 114 may include not only single words but also phrases stored as n-grams, which are sequences of "n" number of consecutive or almost consecutive words.

The article analytics engine 104 is generally configured to operate on the visitor metrics 110, text corpus 112, and document-term matrix 114 to provide information to a user about popular topics and terms in the group of online articles 102. In particular, the article analytics engine 104 analyzes the visitor metrics 110, text corpus 112, and document-term matrix 114 to provide an indication of ranked topics 124 and important terms per topic 126 to a UI component 108 on a user device 108. Additionally, the article analytics engine 104 analyzes the lifespan of topics and terms for the group of online articles 102 and topic/term lifespans 128 are provided to the user device 106 for display via the UI component 108. The information may be presented via the UI component 108 using any number of user interfaces that allow a user to explore the information. The UI component 108 is a web browser or other application on the user device 106 that operates to display user interfaces providing information regarding popular topics and terms from the group of online articles 102.

In some configurations, the user may employ the UI component 108 to select a particular visitor segment to analyze. As shown in FIG. 1, information regarding a user-selected visitor segment may be received by the article analytics engine 104 via a user input module 116. The information may include visitor characteristics, such as, for instance, age, gender, or geolocation. By allowing the user to specify a particular visitor segment, the article analytics engine 104 identifies topics and terms popular to that visitor segment. For instance, a user may wish to analyze topics and terms within the group of online articles 102 that are popular to females, aged 25-40.

While the article analytics engine 104 is shown separate from the user device 106, it should be understood that the article analytics engine 104 may be provided on the user device 106 in some configurations or the article analytics engine 104 may be provided remote from the user device 106 in other configurations (e.g., provided on a remote server). If the article analytics engine 104 is remote from the user device 106, the article analytics engine 104 and user device 106 communicate over a network (not shown), which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the article analytics engine 104 may be provided via multiple devices arranged in a distributed environment that collectively provide the functionality described herein. Additionally, other components not shown may also be included within the system 100.

The article analytics engine 104 includes a number of modules that process information regarding the group of online articles 102 to identify popular topics and terms and identify topic/term lifespans, including a topic analysis module 118, term analysis module 120, and topic/term lifespan analysis module 122.

The topic analysis module 118 identifies relevant and popular topics for the group of online articles 102. More details regarding the identification of such topics is provided below with reference to the method 200 of FIG. 2. Generally, the topic analysis module 118 analyzes the text of each online article (stored in the text corpus 112) to identify relevant topics and generates relevance scores indicating the relevance of each topic to each online article. Article topic scores are then generated for each topic and each online article as a function of the relevance score of each topic and visitor metrics for each online article. In instances in which the user has specified a particular visitor segment, the visitor metrics used correspond to that visitor segment. For example, suppose the user has specified a visitor segment corresponding to females, age 25-40. In that case, the visitor metrics used would be page views or unique visitors of females, aged 25-40. An aggregated topic score is computed for each topic by summing the article topic scores for each topic from the online articles. A set of ranked topics 124 is then provided based on the aggregated topic scores. An indication of the ranked topics 124 is provided to the UI component 108 on the user device 106 for display to the user.

The term analysis module 120 identifies important terms for topics identified from the group of online articles 102. More details regarding the identification of important terms for topics from online articles is provided below with reference to the method 300 of FIG. 3. Generally, important terms are identified for a given topic by first computing term scores for terms found in each online article. A term score is computed for a given term and online article as a function of the term frequency of the term in the online article and a score representing the relevance of the given topic to the online article and/or the popularity of the online article. An aggregated term score is computed for each term by summing the term scores for each term from the various online articles. The aggregated term scores for the terms are used to rank the terms for the given topic and an indication of the important terms for each topic 126 is provided to the UI component 108 on the user device 106 for display to the user.

The topic/term lifespan analysis module 122 analyzes the lifespan of topics and terms among the group of online articles 102. This allows a user to explore how particular topics and/or terms have risen and fallen in popularity over time. More details regarding the determination of the lifespan of topics and terms in online articles is provided below with reference to the method 500 of FIG. 5 and the method 700 of FIG. 7. Generally, a lifespan for a given topic or term is determined by computing article topic scores or term scores, respectively, over time intervals (e.g., hourly, daily, weekly, etc.) for each online article representing the relevance and popularity of the topic or term for the online article for each time interval. The article topic scores of the topic or term scores of the term for the various online articles are zero-centered in time to take into account that different online articles are published at different times. Aggregated topics scores or aggregated term scores are then generated for each time interval by summing the topic scores or term scores from each online article for each time interval. As such, the aggregated topic scores or aggregated term scores represent the topic or term lifespan by indicating the relevance and popularity of the topic or term over the time intervals. An indication of the topic/term lifespan 128 is provided to the UI component 108 on the user device 106 for display to the user.

Figure 2:
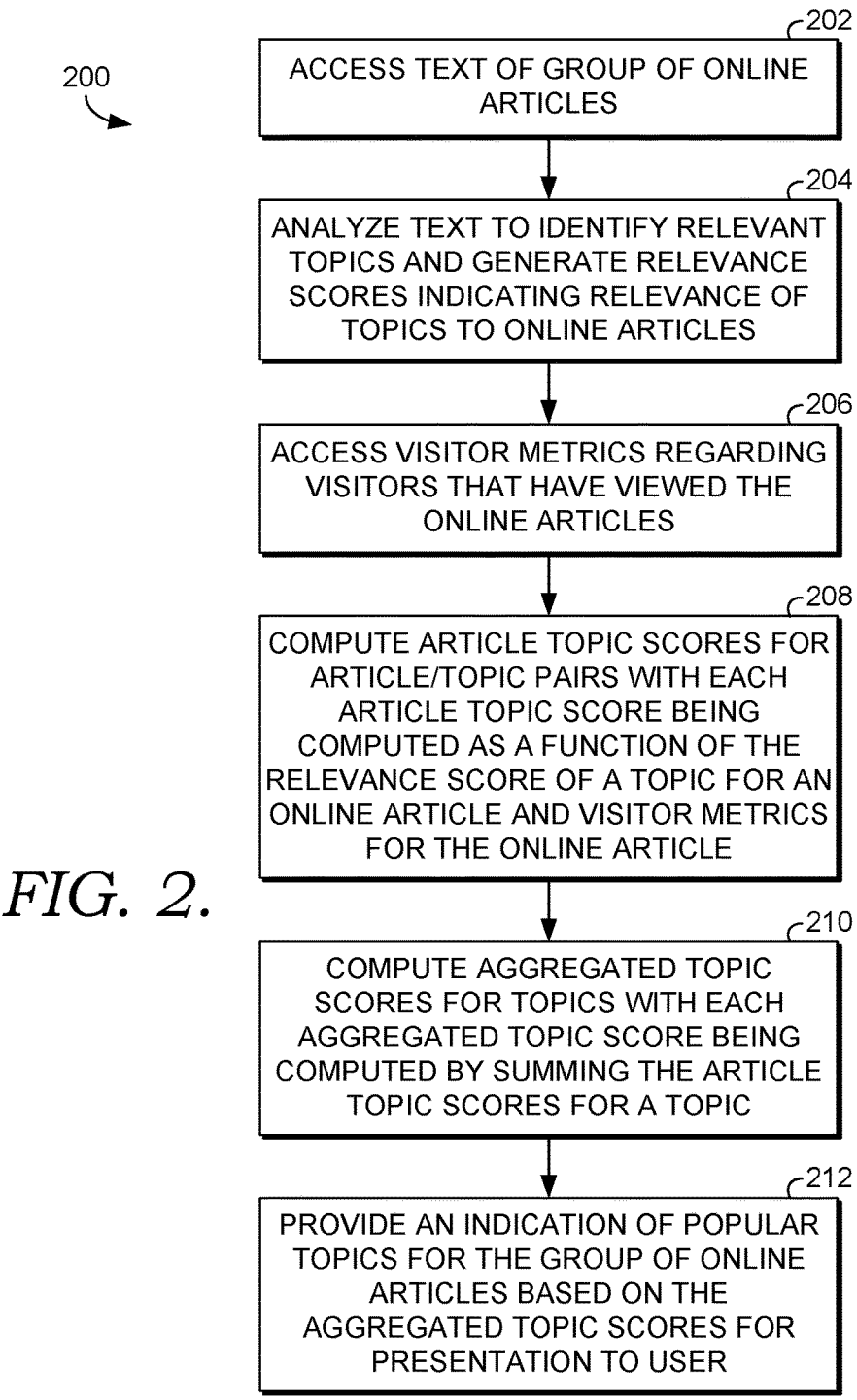
FIG. 2 is a flow diagram showing a method for identifying relevant and popular topics from a group of online articles in accordance with implementations of the present disclosure.

Referring next to FIG. 2, a flow diagram is provided illustrating a method 200 for identifying relevant and popular topics from a group of online articles. Typically, the group of online articles corresponds to a particular website for a given publication. However, other groups of online articles could be analyzed, such as, for instance, a subset of online articles from a given website or a selection of online articles from multiple websites. Each block of the method 200 and any other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method 200 may be performed at least in part, for instance, by the topic analysis module 118 of the article analytics engine 104 in FIG. 1.

As shown at block 202, text is accessed for each online article. The text may initially be retrieved, for instance, using a web crawler to access the URL associated with each online article and download raw text from each URL. The raw text for each online article is stored in a text corpus.

Text for each online article is analyzed to identify relevant topics in each online article, as shown at block 204. For each online article, the analysis takes the text of the online article as input and identifies topics relevant to the online article. Additionally, the analysis provides a relevance score for each identified topic that provides an indication of the relevance of each topic to the online article. By way of example, analysis of the text of an online article about "Jennifer Lawrence's New Dress" could provide relevance scores for several topics as shown in Table 1 below:

TABLE 1

Relevance Scores Example

| Topic | Relevance Score |
|---|---|
| Celebrities | 5.6 |
| Movies | 1.2 |
| Award Ceremonies | 4.5 |
| Gossip | 2.2 |

The topic identification and relevance scores may be generated using known natural language processing (NLP) and/or other machine learning techniques. For instance, an ensemble of classifiers may be built using NLP and machine learning methods over document training corpora for target domain(s). Two types of algorithms in the ensemble may both use a document vector model with topic scoring based on normalized vector similarity. These algorithms are: (1) an ontology-based topic classifier built by semi-supervised machine learning to generate leaf node features; and (2) a logistic regression classifier using Stochastic Gradient Descent (SGD) trained by a supervised learning method. The ontology-driven classifier ranks multi-label classifications for an input document while the logistic regression classifier using SGD outputs single label classifications. It should be understood that the above approach is provided by way of example only. Other approaches could be used, such as, for instance, latent dirichlet allocation (LDA)/latent semantic indexing (LSI) topic modeling methods.

As shown at block 206, visitor metrics are accessed for each online article. The visitor metrics may initially be collected, for instance, using a web analytics tool, such as the ADOBE ANALYTICS tool. In some instances, the visitor metrics used are a total number of page views or unique visitors. In other instances, the visitor metrics used are a number of page views or unique visitors considering only visitors within a particular visitor segment defined by specified visitor characteristics. The visitor characteristics for the visitor segment can be specified by a user. For example, a user may wish to only consider females aged 25 to 40 years old. As such, a user interface can be provided that allows the user to specify visitor characteristics to define the visitor segment, and the visitor metrics are accessed based on those specified visitor characteristics. Additionally, the visitor metrics correspond to a particular time period (e.g., visits within the past 30 days). A default time period can be employed or a selected time period can be specified by the user.

An article topic score is computed for each of at least a portion of the relevant topics for each online article, as shown at block 208. The article topic score for a given topic and online article is computed as a function of the relevance score of the topic for the online article and visitor metrics for the online article. As such, the article topic score reflects the relevance of the topic for the online article and the popularity of the online article. To illustrate using the example above for the online article regarding "Jennifer's New Dress", suppose the visitor metrics used include total unique visitors and the article received 10,000 unique visitors. Given this visitor metric and the relevance scores from above, the article topic score for each topic relevant to the online article is as shown in Table 2 below:

TABLE 2

Article Topic Scores Example

| Topic | Article Topic Score |
|---|---|
| Celebrities | 56,000 |
| Movies | 12,000 |
| Award Ceremonies | 45,000 |
| Gossip | 22,000 |

In the above example, the relevance score and visitor metrics are given equal weighting. In some configurations, different weightings can be applied to the relevance score and visitor metrics when computing the article topic scores. This allows more emphasis to be placed on either relevance of the topic to an online article (by giving the relevance score a greater weighting) or popularity of an online article (by giving the visitor metrics a greater weighting).

An aggregated topic score is computed for each of at least a portion of the topics, as shown at block 210. For a given topic, the aggregated topic score is computed by aggregating the article topic score for the topic from each online article. For instance, suppose the topic "Gossip" was found to be relevant to three different online articles with an article topic score of: 22,000 for a first online article (10,000 unique visitors and relevance score of 2.2); 13,400 for a second online article (2,000 unique visitors and relevance score of 6.7); and 17,000 for a third online article (5,000 unique visitors and a relevance score of 3.4). Based on these article topic scores, the aggregated topic score for the "Gossip" topic is 52,400.

An indication of the popularity of topics from the group of online articles based on the aggregated topic scores is provided for presentation to the user, as shown at block 212. This may include generating one or more user interfaces that provide information regarding the popularity of topics for the online articles. For instance, the topics may be ranked based on aggregated topic scores, and the user interface may provide an indication of the most relevant topics in a ranked order. This allows the user to identify topics that are most popular to visitors of the online articles.

In some configurations, the relevance and popularity of subtopics are also identified within the method 200. In particular, the text analysis performed at block 204 can be used to identify not only topics relevant to each online article but also subtopics relevant to the identified topics, as well as relevance scores for each subtopic. The subtopics may include any number of different levels (e.g., subtopics of topics, subtopics of subtopics, etc.). Aggregated topic scores would be computed for each subtopic within each topic similar to the approach discussed above for computing the aggregated topic scores for the topics by computing article topic scores for each subtopic at block 208 and aggregating the article topic scores to generate aggregated topic scores for each subtopic at block 210. In such configurations, the information provided for presentation to the user at block 212 could include information not only about the popular topics but also the popular subtopics within each topic.

Figure 3:
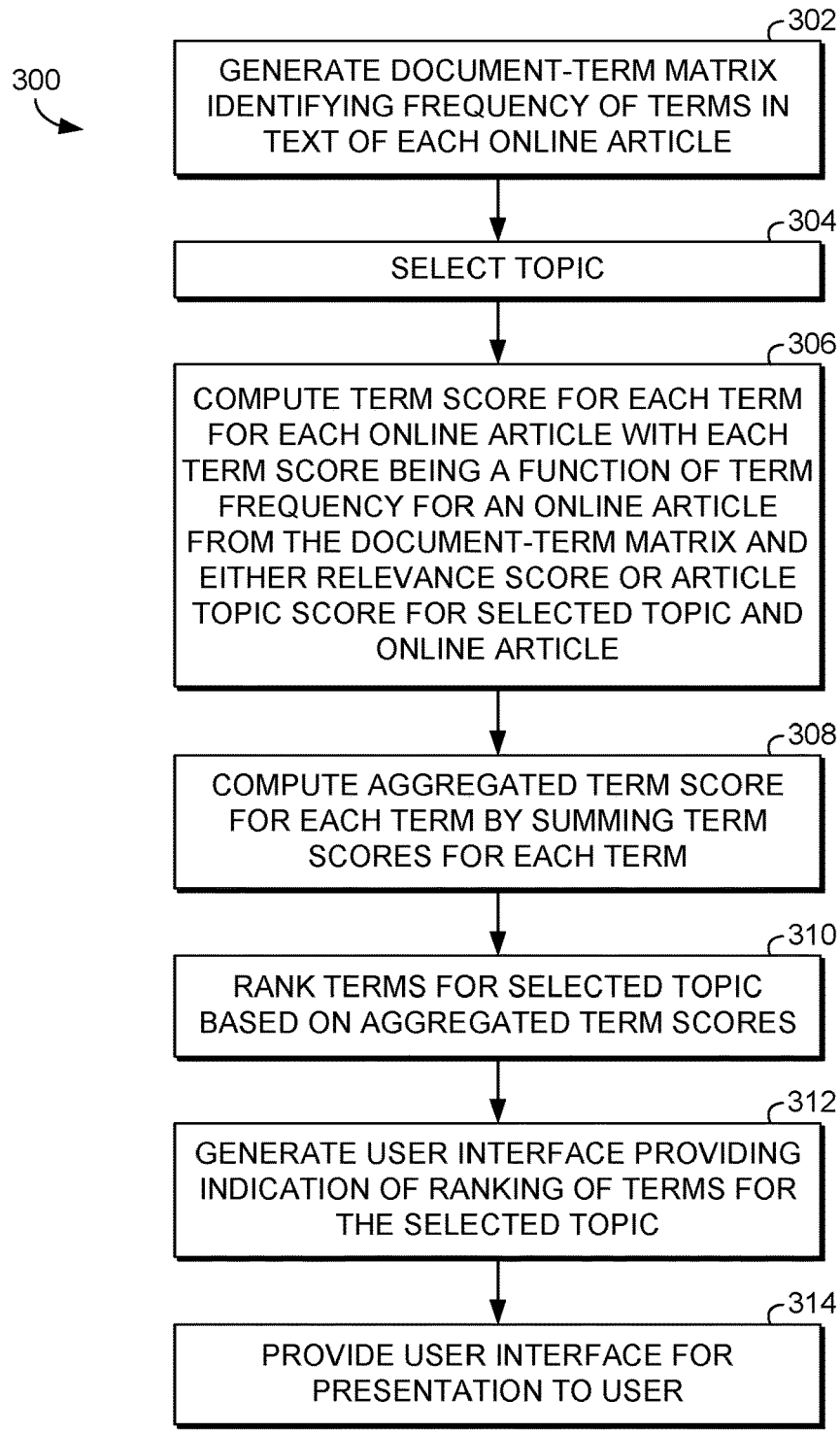
FIG. 3 is a flow diagram showing a method for identifying relevant and popular terms corresponding to topics identified from a group of online articles in accordance with implementations of the present disclosure.

In addition to identifying relevant and popular topics (and subtopics in some configurations) within a group of online articles, some embodiments identify important terms that are relevant and popular within identified topics. FIG. 3 provides a flow diagram illustrating a method 300 for identifying terms important to topics identified from a group of online articles. The method 300 may be performed at least in part, for instance, by the term analysis module 120 of the article analytics engine 104 in FIG. 1. As shown at block 302, a document-term matrix is generated based on the text from a group of online articles. The document-term matrix generally identifies the number of times each term appears in each online article (i.e., a term frequency). For instance, in one configuration, the document-term matrix includes unique terms across the online articles as its columns and unique online articles as its rows. Each online article may be identified in the document-term matrix, for instance, using a URL at which each online article appears. By way of example to illustrate, Table 3 below provides a very simplified document-term matrix. Each value in the document-term matrix represents the number of times the corresponding term appears in the corresponding online article. For instance, the term "Jennifer Lawrence" appears in "Article 1" five times.

TABLE 3

Document-Term Matrix Example

| Article | "Jennifer Lawrence" | "new" | "dress" | "red carpet" |
| --- | --- | --- | --- | --- |
| Article 1 | 5 | 2 | 1 | 0 |
| Article 2 | 5 | 5 | 2 | 4 |
| Article 3 | 8 | 2 | 4 | 2 |

As shown at block 304, a topic is selected for identifying important terms that are relevant and popular within that topic. The topic may be selected from popular topics identified, for instance, in accordance with the method 200 of FIG. 2. A term score is computed for each term and online article pair for that topic, as shown at block 306. The term score reflects the relevance and/or popularity of a term from a given online article to a particular topic. The term score for a given term/online article pair and the given topic is computed as a function of the term frequency (from the document-term matrix) and either the relevance score or article topic score for the given topic and the online article (computed, for instance, as described above with reference to the method 200 of FIG. 2). Using the relevance score would reflect only the relevance of the topic to an online article. Using the article topic score would reflect not only the relevance of the topic to an online article but also the popularity of the online article as reflected by the visitor metrics for the online article. If visitor metrics are used, the visitor metrics can include all visitors or only visitors from a defined visitor segment (e.g., a visitor segment selected by the user).

By way of example to illustrate, suppose that the given topic is "Celebrities." Also suppose that "Article 1" in the document-term matrix of Table 3 is the article about "Jennifer Lawrence's New Dress" discussed above. A term score would be computed for each term for Article 1 by multiplying each number in the row for Article 1 in Table 3 by the relevance score of 5.6 (as shown in Table 1) or the article topic score of 56,000 (relevance score of 5.6 multiplied by 10,000 unique visitors) for the "Celebrities" topic and Article 1. Given this, the term score for "Jennifer Lawrence" for Article 1 would be 28 (if relevance score is used–5 times 5.6) or 280,000 (if article topic score is used–5 times 56,000).

In the above example, no weighting is applied. In other configurations, different weightings may be applied to the term frequency or the relevance score/article topic score when computing the term score, depending on the importance desired to be applied to each component of the term score.

Term scores for each term in each online article could be computed at block 306, for instance, by multiplying each row in the document-term matrix by the relevance score or article topic score for the corresponding online article. An aggregated term score is then computed for each term, as shown at block 308. In particular, the aggregated term score for a given term is the sum of the term scores for the term for the various online articles.

The terms are ranked based on their corresponding aggregated term scores, as shown at block 310. This provides a ranking of the terms that are relevant to and/or popular for the selected topic. As shown at block 312, an indication of the ranked terms for the topic is provided for presentation to the user. For instance, one or more user interfaces may be generated that provide information regarding the ranking of the terms for the topic, thereby allowing the user to explore the important terms for the topic.

Figure 4:
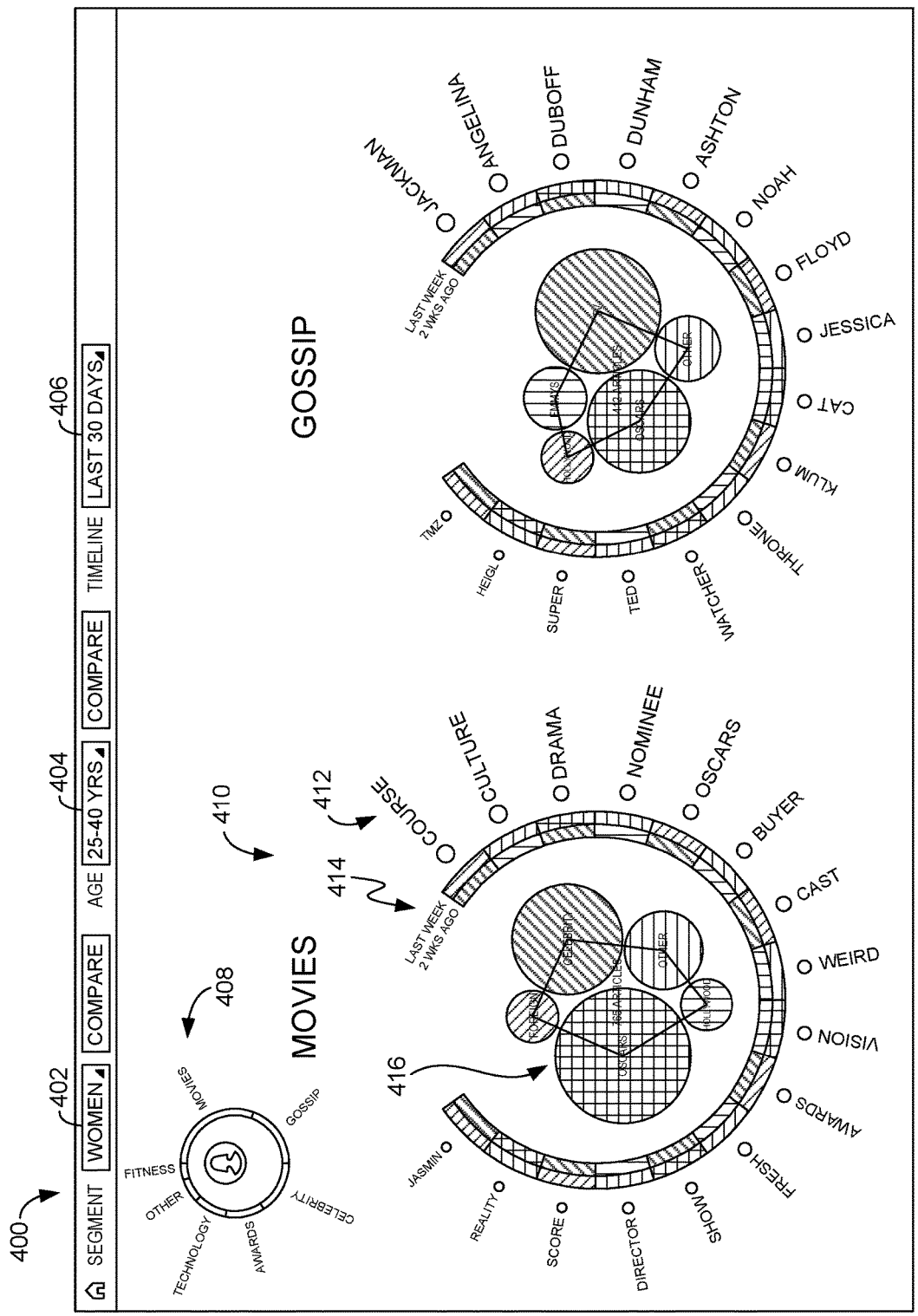
FIG. 4 is a screen display showing an example user interface that provides an indication of relevant/popular topics and subtopics within a group of online articles and relevant/popular terms within each topic.

FIG. 4 provides a screenshot illustrating an example user interface 400 that provides an indication of relevant/popular topics and subtopics within a group of online articles and important terms within each topic. In the present example, the visitor segment selected corresponds to females, 25-40 years old, as represented in the visitor segment selectors 402, 404. Additionally, the visitor metrics used correspond to the last 30 days as shown by the time period selector 406. In embodiments, a user could employ the visitor segment selectors 402, 404 to modify the visitor segment being analyzed. A user could also alter the time period being analyzed using the time period selector 406.

The relative popularity of a number of topics for the selected visitor segment and time period is shown by a topic indicator 408. The ranking of the topics in the present example is as follows: Movies, Gossip, Celebrity, Awards, Technology, Other, and Fitness. The identified topics and/or their rankings would be different for other visitor segments reflecting different interests among varying audiences. The relative popularity of the topics to the group of online articles may be represented in the user interface 400, for instance, by using different coloring, cross-hatching, or other visual indicators.

Topic wheels are provided for identified topics, such as the topic wheel 410 provided for the "Movies" topic. The user can interact with each of these topic wheels, drilling into more detailed views if desired. Surrounding each topic wheel are the specific terms (for instance, as shown at 412) that are statistically significant to the selected visitor segment within each topic. The terms may differ between visitor segments reflecting the statistical differences among various audiences. In the present example, the size of each term reflects its significance to the associated topic for the selected visitor segment. Additionally, bars (for instance, as shown at 414) are included with each term that provide trending information regarding the significance of each term to the topic over time intervals within the selected time period. In the present example, weekly information is provided with different cross-hatching representing different popularity (although color-coding or other approaches may be employed).

Within each topic wheel are subtopics that are popular to this visitor segment. For example, within the "Movies" topic, popular subtopics 416 for the current visitor segment include: "Oscars," "Celebrity," "Other," "Foreign," and "Hollywood." The size of the circle shown for each subtopic represents the relevance/popularity of that subtopic for the selected visitor segment. Different cross-hatching, color-coding, or other approaches may be used to represent the varying relevance/popularity of the subtopics.

Figure 5:
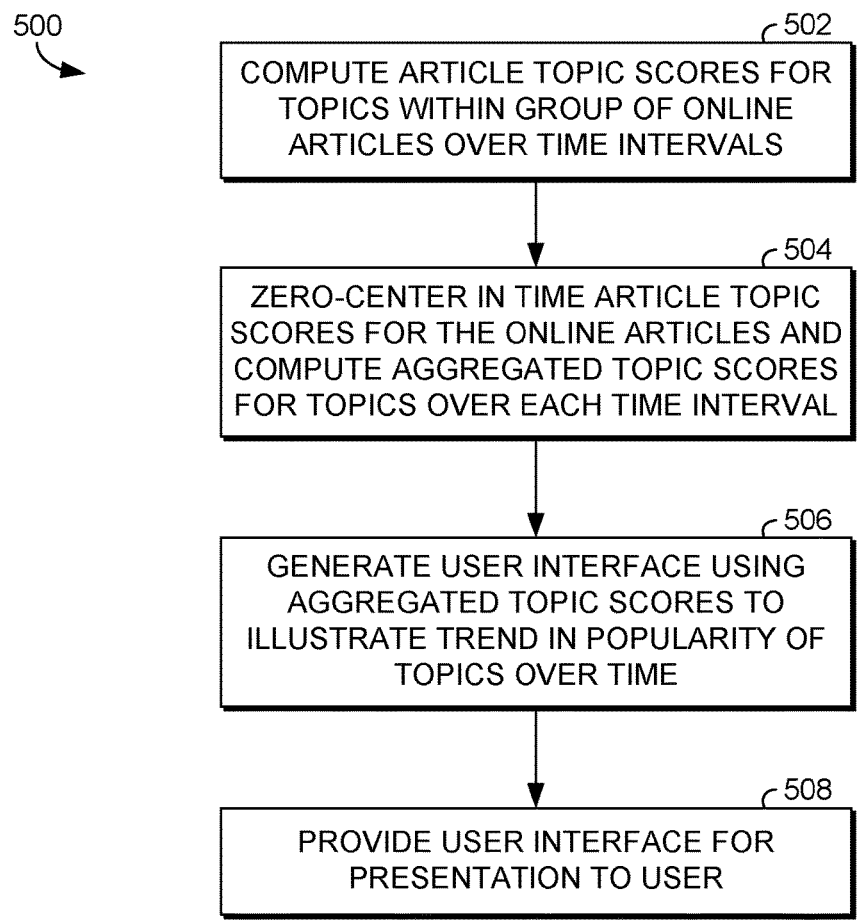
FIG. 5 is a flow diagram showing a method for providing information regarding the lifespan of topics in accordance with implementations of the present disclosure.

Further aspects of the present invention are directed to analyzing the lifespan of topics and terms among online articles. This allows a user to explore how particular topics and/or terms have risen and fallen in popularity over time. FIG. 5 provides a flow diagram showing a method 500 for providing information regarding the lifespan of topics. The method 500 may be performed at least in part, for instance, by the topic/term lifespan analysis module 122 of the article analytics engine 104 in FIG. 1. As shown at block 502, article topic scores are computed for a group of online articles over time intervals within a time period (e.g., daily intervals over a month). This may be done similar to the process of blocks 202 through 208 of FIG. 2 discussed above. However, instead of performing the calculations for a single time period, the calculations are done over multiple time intervals, such as hourly, daily, weekly, or monthly time intervals, for instance. In particular, visitor metrics are collected for each online article for each time interval, and the visitor metrics for each time interval are used to compute the article topic scores of each online article over each time interval.

The article topic scores for the online articles are zero-centered in time, and aggregated topic scores are computed over each time interval for each topic, as shown at block 504. As can be understood, different online articles publish at different points of time. Zero-centering and then summing the article topic scores provides aggregated topic scores that reflect time intervals starting from when online articles were published until some end point. For instance, daily aggregated topic scores for a given topic could be calculated by aggregating the article topic scores on the day each online article was published, the second day after each online article was published, and so on. By way of specific example to illustrate, suppose a first online article is published on November $1^{st}$, and a second online article is published on November $15^{th}$. The aggregated topic score for day 1 would be computed by adding the article topic score for the first online article from November $1^{st}$ with the article topic score for the second online article from November $15^{th}$; the aggregated topic score for day 2 would be computed by adding the article topic score for the first online article from November $2^{nd}$ with the article topic score for the second online article from November $16^{th}$; and so on for each day after the initial publication until some end point (e.g., 30 days after publication).

Figure 6:
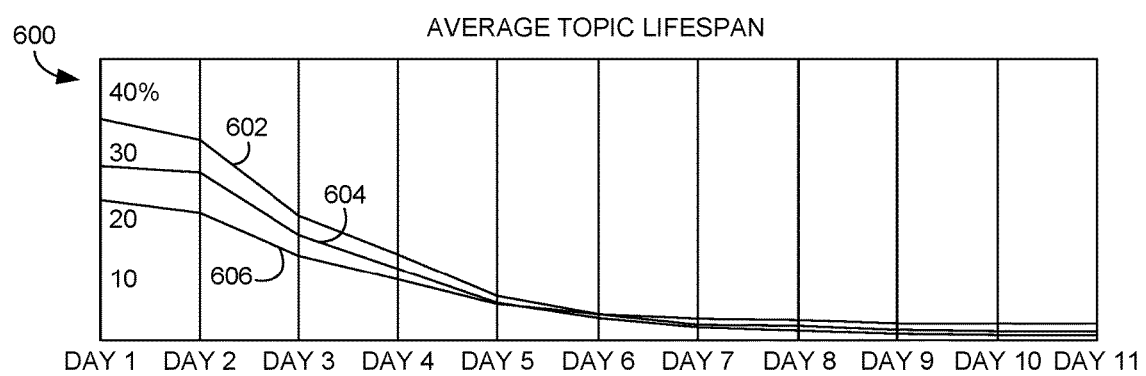
FIG. 6 is a screen display showing a user interface providing an indication of topic lifespan for three topics.

A user interface is generated using the aggregated topic scores over the time intervals to illustrate the trend in popularity of topics over time, as shown at block 506, and the user interface is provided for presentation to a user, as shown at block 508. By way of example to illustrate, FIG. 6 provides a screen display having a user interface 600 showing the topic lifespan for three topics. In particular, each of the lines 602, 604, 606 provides the lifespan for a corresponding topic. In the example of FIG. 6, the popularity of the topics is shown over daily intervals for the first eleven days after publishing the online articles. The graph provided in the user interface 600 provides a representation of the percentage of unique visitors a topic will have each day after publishing. The daily percentage for each topic may be derived by dividing the aggregated topic score for each day by the total of the aggregated topic scores from all the days. For example, suppose the line 602 corresponds to the "Movies" topic. The graph indicates that, on average, articles about "Movies" will receive almost 40% of their total unique visitors on day 1, dropping to almost 30% on day 2, etc. This helps a publisher understand how transient content written about "Movies" will be. It also allows the publisher to benchmark an online article about "Movies" against other articles about "Movies".

Figure 7:
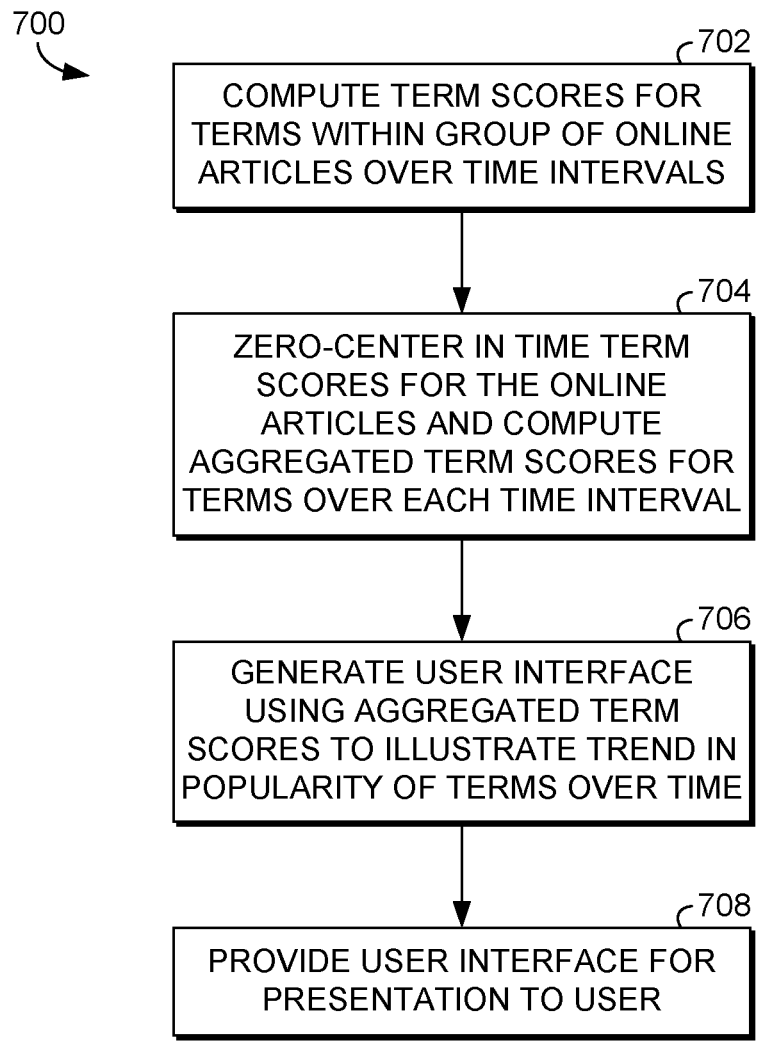
FIG. 7 is a flow diagram showing a method for providing information regarding the lifespan of terms in accordance with implementations of the present disclosure.

A similar approach could be used to determine the lifespan for terms. FIG. 7 provides a flow diagram showing a method 700 for providing information regarding the lifespan of terms. The method 700 may be performed at least in part, for instance, by the topic/term lifespan analysis module 122 of the article analytics engine 104 in FIG. 1. As shown at block 702, term scores are computed for a group of online articles over time intervals within a time period (e.g., daily intervals over a month). This is done similar to the blocks 302 through 306 of FIG. 3. However, instead of performing the calculations for a single time period, the calculations are done over multiple time intervals, such as hourly, daily, weekly, or monthly time intervals, for instance. In particular, visitor metrics are collected for each online article for each time interval, and the visitor metrics for each time interval are used to compute the term scores of terms for each online article over each time interval.

The term scores for the online articles are zero-centered in time, and aggregated term scores are computed over each time interval for each term, as shown at block 704. As noted above, since different online articles publish at different points of time, zero-centering in time and then summing the term scores provides aggregated term scores that reflect time intervals starting from when online articles were published until some end point.

A user interface is generated using the aggregated term scores over the time intervals to illustrate the trend in popularity of terms over time, as shown at block 706, and the user interface is provided for presentation to a user, as shown at block 708. For example, a user interface similar to the user interface 600 of FIG. 6 could be provide that includes a line for each term indicating the popularity of the term over the time intervals.

Topic and Term Search Analytics

Further embodiments are directed to a solution that allows a user to select any combination of topic(s) and/or term(s) and receive a list of the most popular online articles relevant to those selected topic(s) and/or term(s) so the user can see what type of content has been successful in the past. Additionally, some embodiments are directed to identifying important terms associated with a given selection of topic(s) and/or term(s) based on the most relevant and popular online articles for the selected topics/terms.

Figure 8:
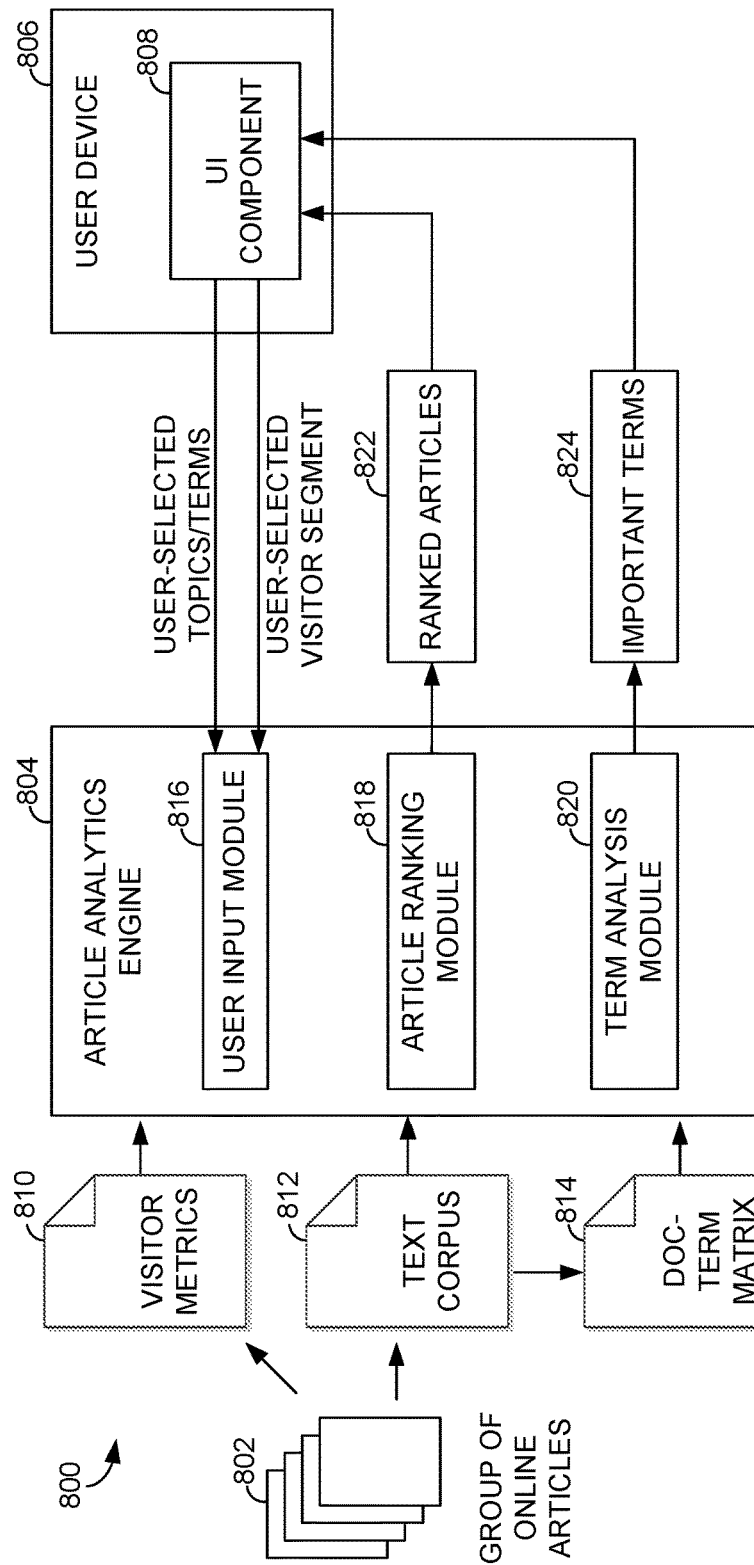
FIG. 8 is a block diagram illustrating an exemplary system in accordance with other implementations of the present disclosure.

FIG. 8 is a block diagram illustrating an exemplary system 800 for identifying relevant and popular online articles given a set of user-selected topic(s) and/or term(s), as well as important terms for the selected topic(s) and/or term(s) in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 800 is an example of a suitable architecture for implementing certain aspects of the present disclosure. Among other components not shown, the system 800 includes an article analytics engine 804 configured to process information regarding a group of online articles 802 to provide user interfaces that allow a user to investigate popular online articles given a selection of topic(s) and/or term(s) and to also investigate popular terms in those articles. The article analytics engine 804 may be provided, for instance, by a web analytics tool, such as the ADOBE ANALYTICS tool (available from Adobe Systems Inc. of San Jose, Calif.).

The group of online articles 802 may be similar to the group of online articles 102 discussed above in FIG. 1. Additionally, the visitor metrics 810, text corpus 812, and document-term matrix 814 may be similar to the visitor metrics 110, text corpus 112, and document-term matrix 114, respectively, also discussed above with reference to FIG. 1.

The article analytics engine 804 is generally configured to operate on the visitor metrics 810, the text corpus 812, and document-term matrix 814 to provide information to a user about popular online articles and terms from those articles given a selection of topic(s) and/or term(s). The information may be presented via the UI component 808 using any number of user interfaces that allow a user to explore the information. The UI component 808 is a web browser or other application on the user device 806 that operates to display user interfaces providing information regarding popular online articles and important terms.

The user may employ the UI component 808 to select one or more topics and/or one or more terms to explore popular online articles for those topics/terms, as well as important terms within those online articles. In some configurations, the user may also employ the UI component 808 to select a particular visitor segment to analyze. As shown in FIG. 8, information regarding user-selected topics/terms and a user-selected visitor segment may be received by the article analytics engine 804 via a user input module 816. The visitor segment information may include visitor characteristics, such as, for instance, age, gender, or geolocation. By allowing the user to specify a particular visitor segment, the article analytics engine 804 identifies online articles and terms popular to that visitor segment.

While the article analytics engine 804 is shown separate from the user device 806, it should be understood that the article analytics engine 804 may be provided on the user device 806 in some configurations or the article analytics engine 804 may be provided remote from the user device 806 in other configurations (e.g., provided on a remote server). If the article analytics engine 804 is remote from the user device 806, the article analytics engine 804 and user device 806 communicate over a network (not shown), which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 800 within the scope of the present invention. Each may comprise a single device or multiple devices cooperating in a distributed environment. For instance, the article analytics engine 804 may be provided via multiple devices arranged in a distributed environment that collectively provide the functionality described herein. Additionally, other components not shown may also be included within the system 800.

The article analytics engine 804 includes a number of modules that process information regarding the group of online articles 802 to identify relevant and popular online articles and important terms given a selection of topic(s) and/or term(s), including an article ranking module 818 and a term analysis module 820. Although not shown in FIG. 8, in some configurations, the article analytics engine 804 may also include modules from the article analytics engine 104 of FIG. 1, including the topic analysis module 118, term analysis module 120, and topic/term lifespan analysis module 122.

The article ranking module 818 identifies relevant and popular online articles given a user selection of one or more topics and/or terms. More details regarding the identification of such articles is provided below with reference to the method 900 of FIG. 9. Generally, given user selected topic(s) and/or term(s), the article ranking module 818 computes article scores for online articles. An article score for a given online article is a function of the online article's relevance to the selected topic(s) and/or term(s) and popularity of the online article based on the visitor metrics for the online article. In instances in which the user has also specified a particular visitor segment, the visitor metrics used correspond to that visitor segment. A set of ranked articles 822 is then provided based on the article scores. An indication of the ranked articles 822 is provided to the UI component 808 on the user device 806 for display to the user.

The term analysis module 820 identifies important terms based on relevant/popular online articles for a given user selection of topic(s) and/or term(s). More details regarding the identification of popular terms is provided below with reference to the method 1200 of FIG. 12. Generally, given a user selection of topic(s) and/or term(s), popular online articles are selected, for instance, by the article ranking module 818. The term analysis module 820 generates term scores for terms in each online article as a function of term frequency and an article score for each online article (the article score reflecting the online article's relevance to the topic(s)/term(s) and the online article's popularity). An aggregated term score is generated for a given term by summing the term scores for the term from each of the popular online articles. Information regarding popular terms 824 based on the aggregated term scores is provided to the UI component 808 on the user device 806 for presentation to the user.

Figure 9:
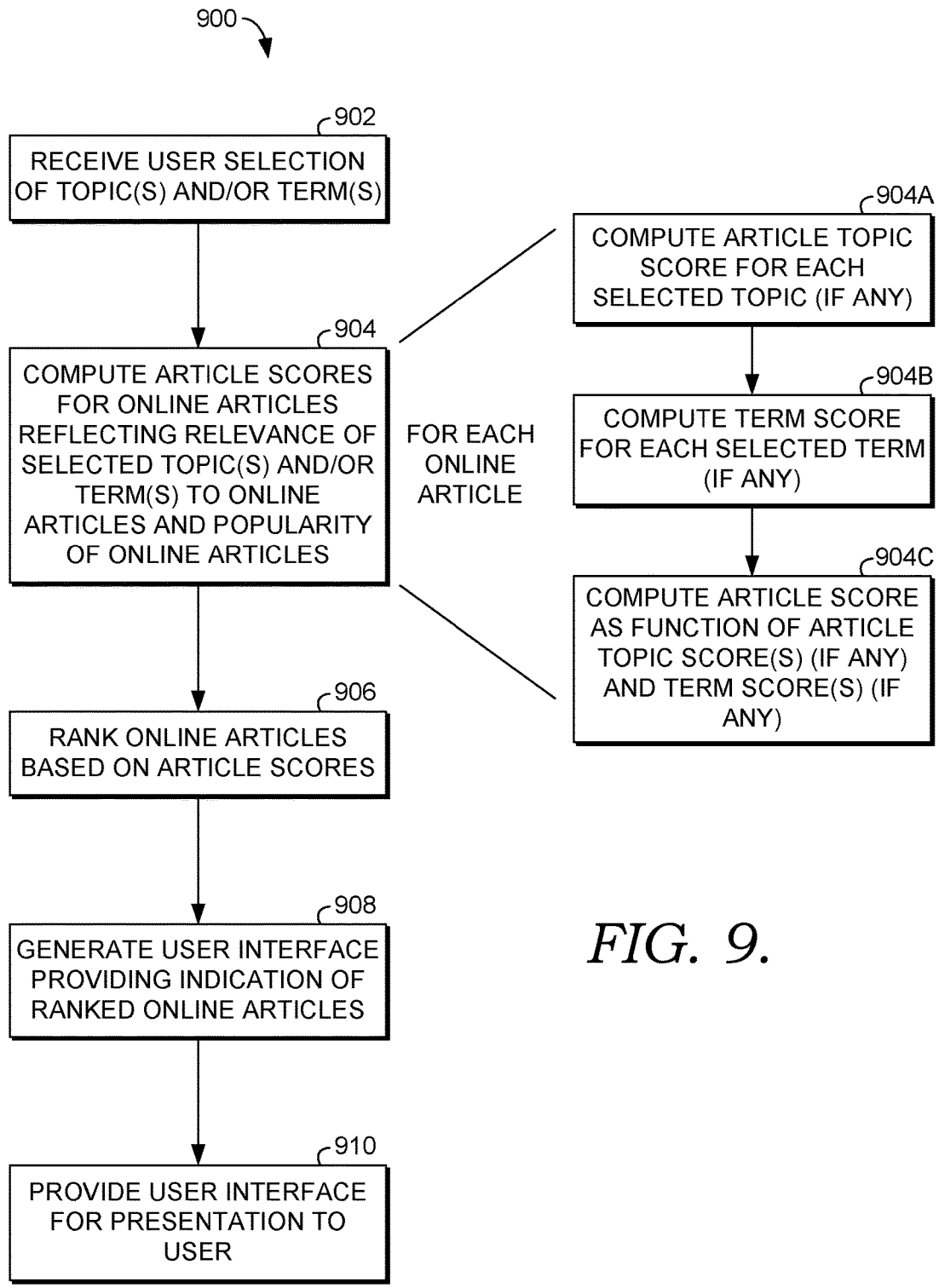
FIG. 9 is a flow diagram showing a method for identifying online articles that are popular and related to a selection of topics and/or terms in accordance with implementations of the present disclosure.

With reference now to FIG. 9, a flow diagram is provided that illustrates a method 900 for identifying online articles that are popular and related to a user selection of topic(s) and/or term(s). The method 900 may be performed at least in part, for instance, by the article ranking module 818 of the article analytics engine 804 in FIG. 8. As shown at block 902, a user selection of topic(s) and/or term(s) is received. Any combination of topics and/or terms may be selected by the user. For instance, one or more topics may be selected in some instances, one or more terms may be selected in other instances, and a combination of one or more topics and one or more terms may be selected in further instances. Any topics and/or terms that are of interest to the user may be selected.

Figure 10:
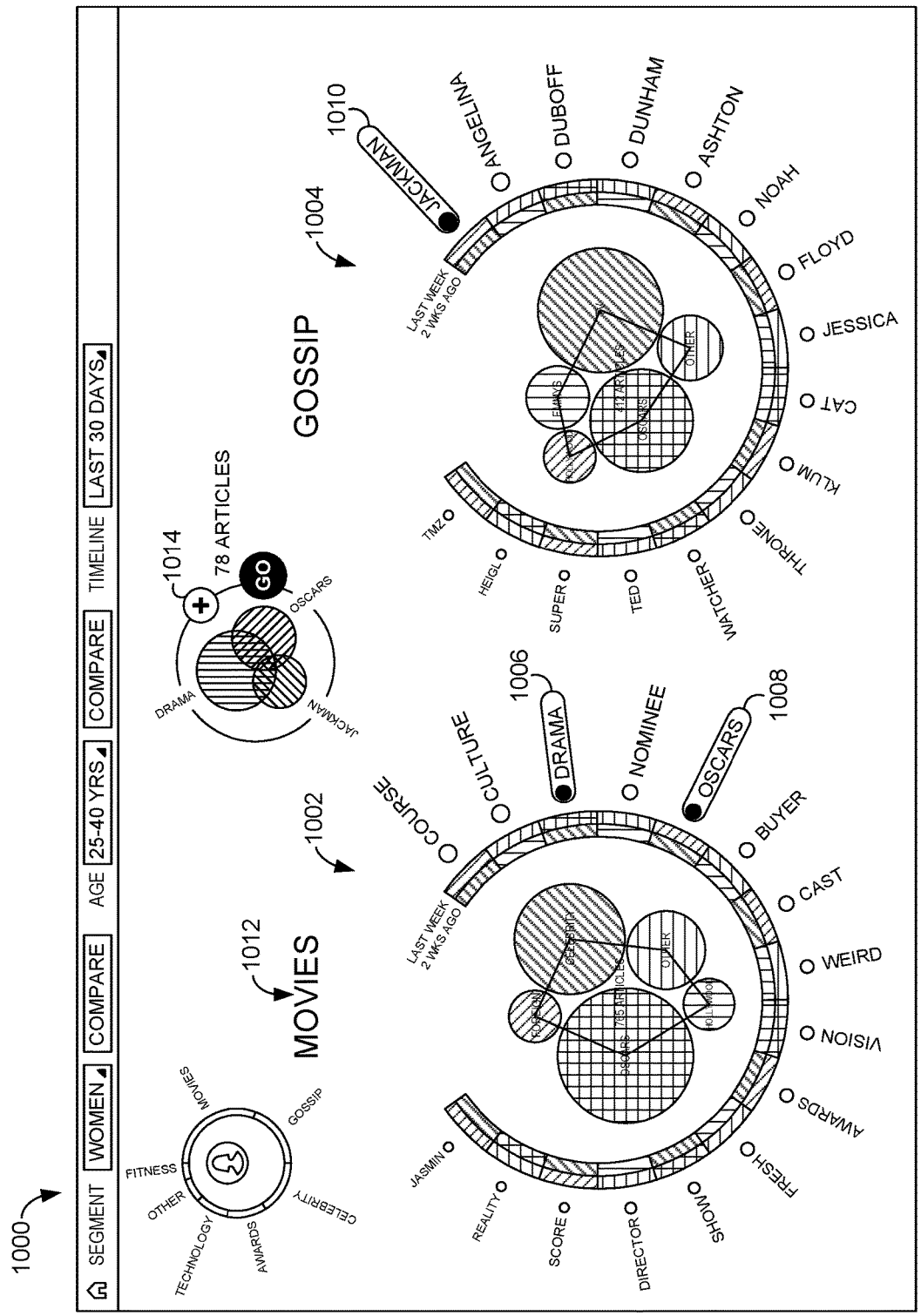
FIG. 10 is a screen display showing a user interface showing relevant and popular topics and terms identified from a group of online articles and allowing for user selection of topics and/or terms for analysis.

A user interface is provided that allows the user to select the topics and/or terms in any of a variety of different manners. By way of example to illustrate, FIG. 10 provides a screen display showing a user interface 1000 providing relevant and popular topics and terms identified from a group of online articles using an approach such as that described above with reference to FIGS. 2 and 3. The user interface 1000 allows a user to select topics and/or terms, for instance, by clicking on the topics and/or terms in the user interface 1000. In the present example of FIG. 10, a user has selected three terms: "drama," 1006 "Oscars," 1008 and "Jackman" 1010 from the topic wheels 1002 and 1004, for instance, by clicking on the terms displayed in the user interface 1000. The user could similarly select a topic, for instance, by clicking on a topic, such as the "Movies" topic 1012. Alternatively or additionally, a text input box could be provided that allows a user to simply enter topics and/or terms. For instance, the user interface 1000 includes a user interface element 1014 that, when selected by a user, presents a text input box that allows a user to type topics and terms into the text input box.

Returning to FIG. 9, an article score is computed for each online article from a group of online articles based on the selected topic(s) and/or term(s), as shown at block 904. An article score for a particular online article reflects both the relevance of the selected topic(s) and/or term(s) to the online article as well as the popularity of the online article. The process of computing an article score for a given online article is illustrated at blocks 904A through 904C. As shown at block 904A, the article topic score for the online article and each selected topic (if any) is computed as a function of the relevance score of the topic for the online article and visitor metrics for the online article. This is similar to the article topic score computed above at blocks 202 through 208 of FIG. 2. As shown at block 904B, the term score for the online article and each selected term (if any) is computed as a function of the frequency of the term in the online article (from the document-term matrix) and visitor metrics for the online article. Visitor metrics used in calculating the article topic score and term score may include all visitors or only a segment of visitors defined by selected visitor characters, such as gender and age. The article score is then computed for the online article by summing the article topic score(s) and/or term score(s), as shown at block 904C. For instance, in the example from FIG. 10 in which the user has selected the terms "drama," "Oscars" and "Jackman," suppose an article had 10,000 unique visitors within the selected visitor segment (i.e., women, ages 25-40 years old). Additionally, suppose that "drama" appeared in the article four times, "Oscars" appeared five times, and "Jackman" appeared two times. The term scores for the article in this example would be 40,000, 50,000, and 20,000, respectively. The article score would then be the sum of these term scores: 110,000. Although no weighting was applied in the present example, it should be understood that weighting may be applied in some embodiments to provide greater emphasis to relevance (i.e., greater weighting to topic relevance or term frequency) or popularity (i.e., greater weighting to visitor metrics).

Figure 11:
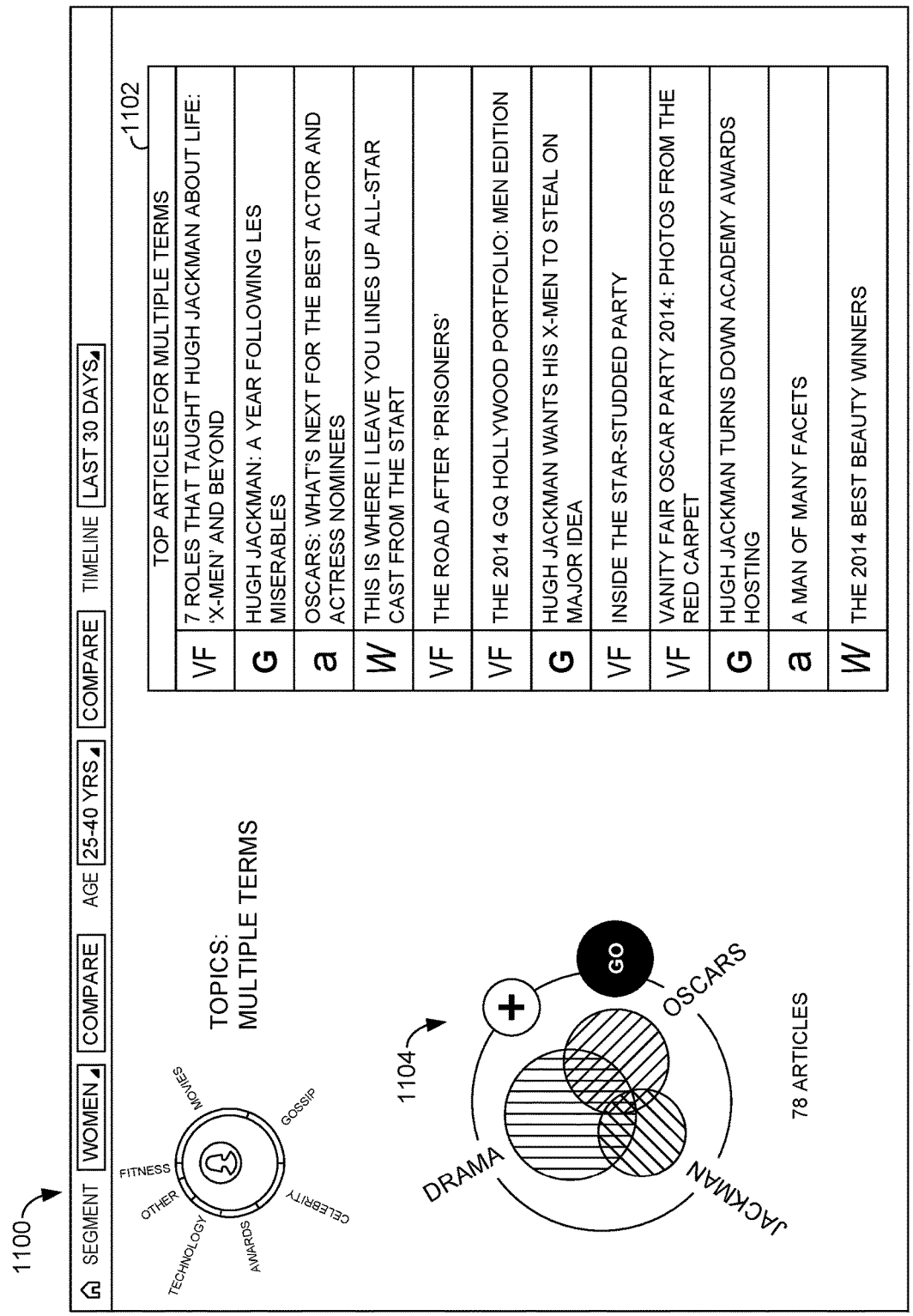
FIG. 11 is a screen display showing a ranked listing of online articles selected in response to a user selection of terms.

Online articles are ranked based on the article scores, as shown at block 906. A user interface is generated that provides an indication of the ranked online articles, as shown at block 908, and the user interface is provided for presentation to a user, as shown at block 910. FIG. 11 provides a user interface 1100 showing a ranked listing of online articles 1102 in response to the user selecting the terms "drama," "Oscar," and "Jackman." The user interface 1100 may be provided, for instance, in response to the user selecting these terms from the user interface 1000 shown in FIG. 10. The ranked listing of online articles 1102 may include all articles within a group of online articles or it may include only higher ranked online articles (e.g., only online articles with an article score above a certain threshold or only the N highest ranked online articles—e.g., the top 20 online articles). The user interface 1100 also includes a Venn diagram 1104 that illustrates how articles regarding the selected terms intersect.

Figure 12:
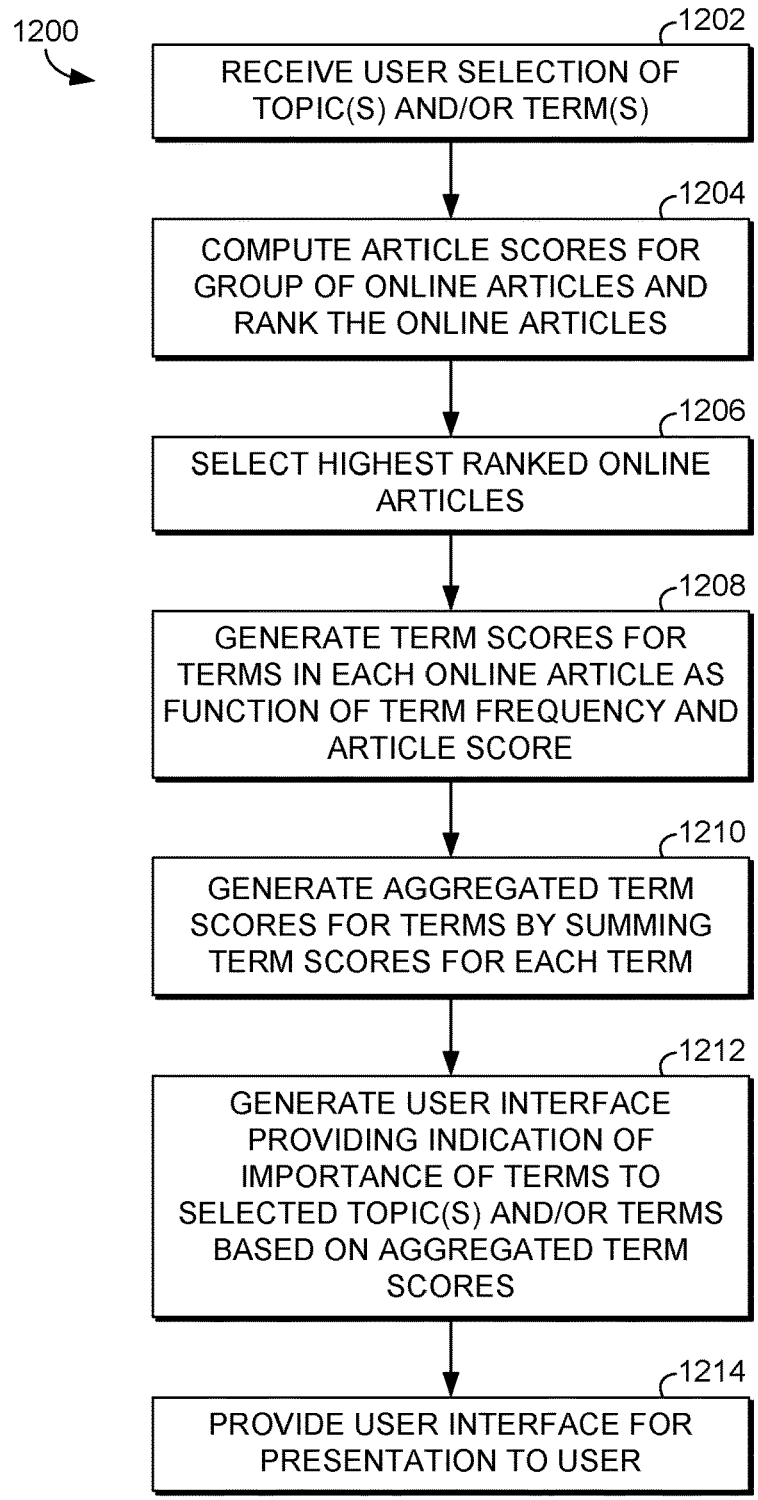
FIG. 12 is a flow diagram showing a method to identify the most important terms associated with a selection of topics and/or terms in accordance with implementations of the present disclosure.

Beyond identifying the more relevant and popular online articles for a given selection of topics and/or terms, some embodiments are directed to identifying the most relevant terms associated with a given selection of topic(s) and/or term(s). Referring now to FIG. 12, a flow diagram is provided that illustrates a method 1200 to identify the most important terms associated with a selection of topic(s) and/or term(s). The method 1200 may be performed at least in part, for instance, by the term analysis module 820 of the article analytics engine 804 in FIG. 8. As shown at block 1202, a user selection of topic(s) and/or term(s) is received. This user selection may be made in a manner similar to that described above for block 902 of FIG. 9. Article scores are computed for online articles that reflect the relevance of the selected topic(s) and/or term(s) for the online articles and the popularity of the online articles, and the online articles are ranked based on the article scores, as shown at block 1204. The online article scoring and ranking may be done using the approach of blocks 904 and 906 of FIG. 9.

The highest ranked online articles are selected, as shown at block 1206. This may include selecting only online articles that have an article score exceeding a threshold or selecting the N highest ranked online articles (e.g., the top 10 ranked online articles). For each selected online article, the article score for that online article is multiplied by the term frequency for terms in the online article (e.g., using a document-term matrix as discussed hereinabove) to provide a term score for each term, as shown at block 1208. The term scores for each term from the selected online articles are summed to provide aggregated term scores, as shown at block 1210.

The aggregated term score for each term represents the importance of that term to the topic(s) and/or term(s) selected by the user at block 1202. A user interface is generated to present information regarding the relative term importance of the terms at block 1212, and the user interface is provided for presentation to the user, as shown at block 1214. The term importance may be represented in the user interface in a variety of different manners within the scope of embodiments herein. For instance, the user interface may provide a ranked listing of the terms. An indication of the aggregated term score could also be provided for each term.

Figure 13:
FIG. 13 is a screen display showing a user interface presenting information regarding importance of terms for several selected terms.

As a specific example, FIG. 13 provides a screen display showing a user interface 1300 presenting information regarding importance of terms for several selected terms using word clouds 1302, 1304, 1306. Each world cloud 1302, 1304, 1306 respectively shows the most popular terms associated with the terms: "Beyonce," "Oscars," and "X-Men." In the present example, each of the terms "Beyonce," "Oscars," and "X-Men" were processed separately as opposed to using them in combination. For example, the user has searched for successful articles related to "Beyonce," and the system presents the terms that relevant to popular online articles about "Beyonce" in the word cloud 1302. Higher ranked terms are shown larger in each of the word clouds 1302, 1304, 1306.

Figure 14:
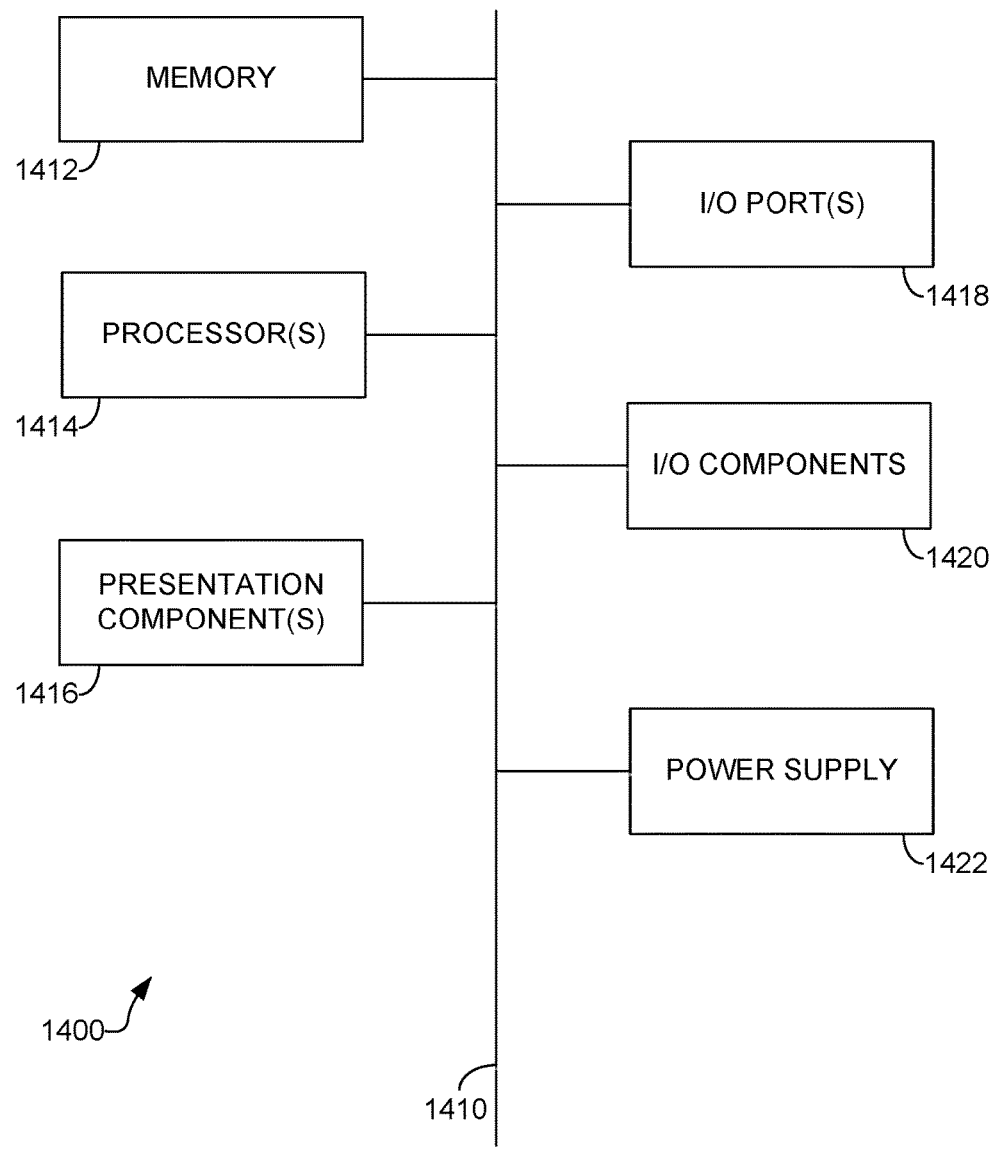
FIG. 14 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should the computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes bus 1410 that directly or indirectly couples the following devices: memory 1412, one or more processors 1414, one or more presentation components 1416, input/output (I/O) ports 1418, input/output components 1420, and illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 14 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer-storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1400. The computing device 1400 may be equipped with depth cameras, such as, stereoscopic camera systems, infrared camera systems, RGB camera systems, and combinations of these for gesture detection and recognition. Additionally, the computing device 1400 may be equipped with accelerometers or gyroscopes that enable detection of motion.

As described above, implementations of the present disclosure relate to techniques for identifying relevant and popular online articles given a selection of topics and/or terms, as well as important terms within those online articles. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for providing a ranked group of online articles based on a selection of one or more topics and one or more terms, the method comprising:
    receiving the selection of the one or more topics and the one or more terms;
    generating an article score for each online article from a group of online articles, the article score for a first online article being generated by:
        computing an article topic score for each topic from the one or more topics, each article topic score being computed as a function of a relevance score of a corresponding topic for the first online article and visitor metrics for the first online article,
        computing a term score for each term from the one or more terms, each term score being computed as a function of a term frequency of a corresponding term in the first online article and the visitor metrics for the first online article, and
        generating the article score for the first online article as a function of the article topic scores for the one or more topics and the term scores for the one or more terms;
    ranking at least a portion of the online articles based on corresponding article scores to generate the ranked group of online articles; and
    providing an indication of the ranked group of online articles for presentation to a user.

2. The method of claim 1, wherein the term score for a first term and the first online article is computed by applying a weighting to at least one selected from the following: the term frequency of the first term in the first online article, and the visitor metrics for the first online article.

3. The method of claim 1, wherein the article topic score for a first topic and the first online article is computed by applying a weighting to at least one selected from the following: the relevance score of the first topic for the first online article, and the visitor metrics for the first online article.

4. The method of claim 1, wherein the selection of the one or more topics is received via a user selection made from a user interface displaying a plurality of popular topics relevant to the group of online articles.

5. The method of claim 1, wherein the visitor metrics correspond to a particular visitor segment.

6. The method of claim 5, wherein the particular visitor segment is defined by one or more visitor characteristics specified by the user.

7. The method of claim 1, wherein the visitor metrics correspond to a particular time period.

8. The method of claim 7, wherein the particular time period is specified by the user.

9. The method of claim 1, wherein providing the indication of the ranked group of online articles for presentation to the user comprises:
    generating a user interface providing information regarding the ranked group of online articles; and
    providing the user interface for presentation to the user.

10. One or more computer storage media storing computer-useable instructions that, when executed by a computing device, cause the computing device to perform operations, the operations comprising:
    receiving a selection of one or more topics and one or more terms;
    generating an article score for each online article from a group of online articles, the article score for a first online article being generated by:
        computing an article topic score for each topic from the one or more topics, each article topic score being computed as a function of a relevance score of a corresponding topic for the first online article and visitor metrics for the first online article,
        computing a term score for each term from the one or more terms, each term score being computed as a function of a term frequency of a corresponding term in the first online article and the visitor metrics for the first online article, and
        generating the article score for the first online article as a function of the article topic scores for the one or more topics and the term scores for the one or more terms;
    ranking at least a portion of the online articles based on corresponding article scores to generate a ranked group of online articles; and
    providing an indication of the ranked group of online articles for presentation to a user.

11. The one or more computer storage media of claim 10, wherein the visitor metrics correspond to a particular visitor segment defined by one or more visitor characteristics specified by the user.

12. The one or more computer storage media of claim 10, wherein the visitor metrics correspond to a particular time period specified by the user.

13. The one or more computer storage media of claim 10, wherein providing the indication of the ranked group of online articles for presentation to the user comprises:
generating a user interface providing information regarding the ranked group of online articles; and
providing the user interface for presentation to the user.

14. A computer system comprising:
one or more processors; and
one or more computer storage media storing computer useable instructions to cause the one or more processors to:
receive a selection of one or more topics and/or one or more terms;
compute article scores for a group of online articles based on the one or more topics and/or one or more terms;
select a subset of online articles based on corresponding article scores;
generate an aggregated term score for each of a plurality of terms in the subset of online articles, the aggregated term score for a first term being generated by:
computing a term score for the first term for each online article from the subset of online articles, each term score being computed as a function of a term frequency of the first term in a corresponding online article and an article score for the corresponding online article, and
summing the term scores for the first term to generate the aggregated term score for the first term; and
providing an indication of importance of at least a portion of the terms to the one or more topics and/or one or more terms based on the aggregated term scores.

15. The system of claim 14, wherein the article score for a first online article is computed by:
when the selection includes one or more topics, computing an article topic score for each of the one or more topics, each article topic score being computed as a function of a relevance score of a corresponding topic for the first online article and visitor metrics for the first online article;
when the selection includes one or more terms, computing a term score for each of the one or more terms, each term score being computed as a function of term frequency of a corresponding term in the first online article and the visitor metrics for the first online article; and
summing any article topic scores and any term scores to generate the article score for the first online article.

16. The system of claim 14, wherein the subset of online articles are selected based on corresponding article scores for the subset of online articles exceeding an article score threshold.

17. The system of claim 14, wherein the visitor metrics correspond to a particular visitor segment defined by one or more visitor characteristics specified by the user.

18. The system of claim 14, wherein the visitor metrics correspond to a particular time period specified by the user.

\* \* \* \* \*